United States Patent

[11] 3,608,971

| [72] | Inventor | Paul F. Seibold<br>26665 York Road, Huntington Woods,<br>Mich. 48070 |
|---|---|---|
| [21] | Appl. No. | 813,567 |
| [22] | Filed | Apr. 4, 1969 |
| [45] | Patented | Sept. 28, 1971 |

[54] SPOKED WHEEL AND METHOD OF CONSTRUCTION
9 Claims, 6 Drawing Figs.

| [52] | U.S. Cl. | 301/58, 29/159.02 |
|---|---|---|
| [51] | Int. Cl. | B60b 1/04 |
| [50] | Field of Search | 301/55, 56, 58, 59, 60, 57; 29/159.02 |

[56] References Cited
UNITED STATES PATENTS

| 353,060 | 11/1886 | Harris | 301/59 |
|---|---|---|---|
| 444,430 | 1/1891 | Gedge | 301/55 |
| 886,565 | 5/1908 | Williams | 301/57 |

*Primary Examiner*—Richard J. Johnson
*Attorney*—Harness, Dickey & Pierce

ABSTRACT: A spoked wheel has a tired rim with U-shaped wire spoke elements having a web, two arms with outwardly extending ends which are secured in spaced corrugations in a central hub section. The webs are secured in tongues struck inwardly from the central portion of the rim which tension the spoke elements when the tongues are forced outwardly.

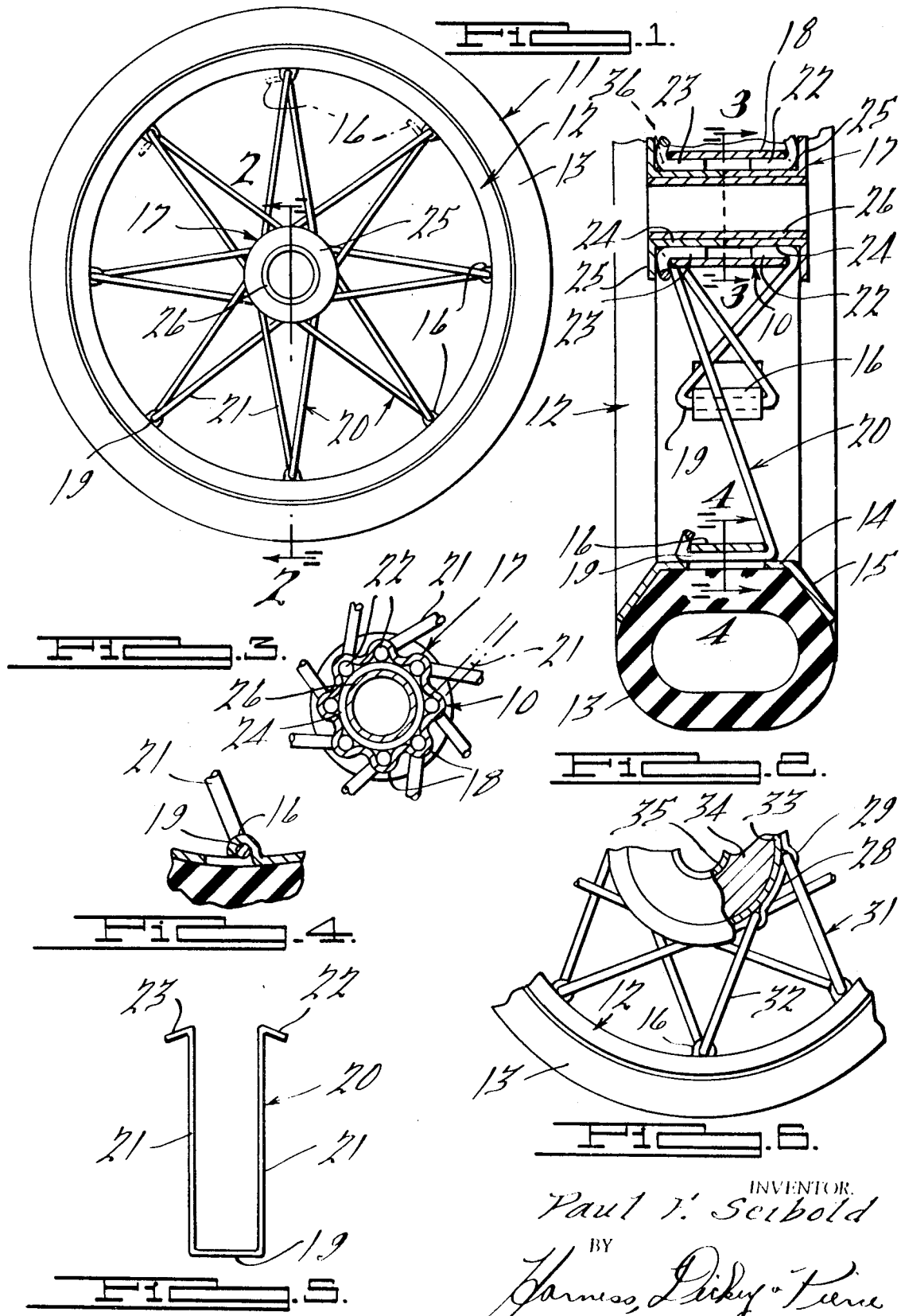

3,608,971

SPOKED WHEEL AND METHOD OF CONSTRUCTION

BACKGROUND OF THE INVENTION

No wheel is known which employs U-shaped spoke elements the arms of which crossing each other and those of other spoke elements when secured to a hub and a rim.

SUMMARY OF THE INVENTION

The wheel has a channel-shaped rim with equally spaced cutout tongues extending inwardly from the inner face of the rim. The hub is made from a tube which has corrugations formed in the wall thereof equal to the number of tongues in the rim. The spoke elements are formed of wire into U-shape, having a web and two extending arms which are flanged at the ends to extend outwardly at an angle less than 90° and located substantially in a plane through the arms. The flanged ends of each spoke element are secured within the different corrugations with the arms preferably in crossed relation, that is to say, with the flange of the inside arm disposed in the outside end of the corrugation and that of the outside are in the inside end of a spaced corrugation. A pair of flanged sleeves are then slid into opposite ends of the corrugated sleeve into abutted relation to each other. Current is applied to the flanges to cause the abutted ends to be butt welded and the sleeve flanges to firmly engage the outer ends of the spoke flanges. The web joining the arms is inserted in the tongues and the tongues are bent therearound and forced outwardly to apply an outward tension to the arms. The flash from the welded sleeves is removed by a reaming operation and the assembly painted. A bearing is pressed into the reamed sleeve and a tire is stretched over and supported by the rim.

BRIEF DESCRIPTION OF THE DRAWING

FIG. 1 is a view in elevation of a wheel having crossed wire spokes in the plane of the wheel and normal thereto embodying features of the present invention;

FIG. 2 is an enlarged broken sectional view of the structure illustrated in FIG. 1, taken on the line 2—2 thereof;

FIG. 3 is a broken sectional view of the structure illustrated in FIG. 2, taken on the line 3—3 thereof;

FIG. 4 is a broken sectional view of the structure illustrated in FIG. 2, taken on the line 4—4 thereof;

FIG. 5 is a view of a spoke element employed in the wheel illustrated in the foregoing FIGS, and FIG. 6 is a broken view of structure, similar to that illustrated in FIG. 1, showing a further form which the invention may assume.

DESCRIPTION OF THE PREFERRED EMBODIMENT

Referring to FIGS. 1 to 5, a wheel 11 has a channel shape circular rim 12 which supports a tire 13 made of elastomeric material. The rim has a central web portion 14 and diverging side flanges 15. The central web portion 14 of the rim 12 has spaced struckout tongues 16 extending inwardly thereof. A hub 17 has a cylindrical tube 10 formed to provide corrugations 18 equal in number to the number of tongues 16 in the rim. Spoke elements 20 are made of wire bent into U-shape to have a web 19, extending arms 21 and flanged sections 22 and 23 at the ends. The flanged sections 22 and 23 extend outwardly and are bent backwardly toward the arms 21 to be at an angle less than 90° thereto. The flanged sections are disposed substantially in a plane through the two arms 21. The flanged section 22 of spoke elements 20 are inserted from the opposite ends in a spaced corrugation to have the arms 21 in crossed relation. In the example herein illustrated, the flanged section 22 is inserted in one of the corrugations 18 while the flanged section 23 skips one of the corrugations 18. The arm 21 illustrated in dot and dash line will cross the arm 21 of the adjacent spoke element which has its end 22 inserted in the corrugation 18 disposed therebetween. The flanged sections 22 and 23 may be placed in the same corrugation with the ends extending toward each other or the arms 21 may be placed in greater angular relation by skipping more than one of the corrugations to provide different cross relationships between the arms in planes parallel and normal to the wheel.

When all of the flanged sections 22 and 23 have been placed in the corrugations 18, with the arms 21 of each spoke element in crossed relation in the two planes, the spoke elements will be fixed to the corrugated sleeve. Sleeves 24 having a flange 25 on the outer end are forced inwardly from opposite sides of the corrugated sleeve and a welding current is passed therethrough to form a butt weld to the abutted ends. After the flanges 25 have engaged the outer ends of the flanged sections 22 and 23 and forced them tightly against the ends of the corrugation sleeve the current is cut off and shortly thereafter the electrodes are retracted to have the flanges 25 retain the flanged ends in the firm assembled relations.

The flash of the weld is removed from within the sleeves 24 by a reaming or similar operation which produces a true cylindrical form within the central portion of the hub. A sleeve bearing 26 when, required, is press fitted within the welded sleeves 24. It is to be understood that the sleeve 10 containing the corrugations 18 and the sleeves 24 may be of larger diameters so that the roller, ball or other type of bearing could be secured therewithin in place of the sleeve bearing 26. The webs 19 of the spoke elements 20 are inserted into the struckout tongue 16 which are then pressed outwardly about the webs to provide tensions to the arm 21. The resulting wheel may be then painted in the conventional manner, preferably before the bearing 16 is inserted within the hub. After the painting operation the tire 13 is stretched over the rim to complete the wheel.

In FIG. 6, a slightly modifies form of the invention is illustrated that wherein a sleeve 28 of substantial diameter has corrugations 29 formed therein spaced a greater distance apart than the corrugations 18. The U-shaped spoke elements 31 have arms 32 shorter in length than the arms 21 to change the appearance of the wheel and provide greater strength thereto. In this arrangement sleeves 33 are forced within the corrugated sleeve 28 and butt welded together in a manner pointed out hereinabove. It is to be understood that a single sleeve with a flange on one end could be forced through the corrugated sleeve 28 from one side of the assembly and flange the extended end at the other side in a known manner to thereby eliminate the welding operation. A thick-walled sleeve 34 The webs 19 of the spoke elements 31 are secured within the tongue 16 of the rim 12 to be tensioned in a manner pointed out hereinabove. Otherwise, the wheel is the same as that described hereinabove with regard to the structure of FIGS. 1 to 5 inclusive. It is to be understood that the sleeves 24 and 33 could be made of brass or some other bearing material to thereby eliminate the bearing supported therewithin. The heavy wall sleeve could be provided with a babbit or similar bearing material on the inner surface of the central aperture or could be made of a material having bearing properties. The ends of the corrugations 18 and 29 could be chamfered by machining a 45°bevel at the ends as illustrated at 36 in FIG. 2. The chamfered ends captures the adjacent end of the arm and retains them positioned when assembled in the hub.

I claim:

1. A wheel having a rim, inwardly extending cutout cantilevered tongues on the inner surface of the rim each bent to form a hook having the unsecured end deflected toward the rim, U-shaped spoke elements having a straight web and two arms with an angularly extending section at the ends, a hub having a plurality of apertures which receive respective angular extending sections of each spoke in circumferentially spaced apertures, and means for securing said spoke-extending sections within said apertures, said spoke elements being secured to the rim by said bent hooks which engate said webs and apply a tension to the said spoke arms.

2. A wheel having a rim as recited in claim 1, wherein said means for securing said spoke sections within said apertures in a tubular member having a flange at each end which engage the outer ends of said spoke sections.

3. A wheel having a rim as recited in claim 2, wherein a bushing is mounted within said tubular member having bearing means on the inner surface thereof.

4. A wheel having a rim as recited in claim 1, wherein said means for securing said spoke sections within said apertures embodying a pair of flanged sleeves butt welded together within the hub.

5. A wheel having a rim as recited in claim 4, wherein a bearing is supported within said tubular member.

6. A wheel having a rim as recited in claim 1, wherein the apertures in the hub are provided by a sleeve having corrugations thereacross.

7. A wheel as recited in claim 6, wherein the ends of the corrugations are chamfered.

8. A wheel as recited in claim 1, wherein the wheel rim has a central web and outwardly extending side flanges forming a channel section.

9. A wheel as recited in claim 8, wherein a tire of elastomeric material is supported by said rim.

UNITED STATES PATENT OFFICE
CERTIFICATE OF CORRECTION

Patent No. 3,608,971          Dated September 28, 1971

Inventor(s) Paul F. Seibold

It is certified that error appears in the above-identified patent and that said Letters Patent are hereby corrected as shown below:

Col. 1, line 21, "are" should be --arm--; Col. 2, line 29, "16" should be --26--; Col. 2, line 32, "modifies" should be --modified--; Col. 2, line 44, after "34" insert --, if required, is press fitted within the sleeve or reamed sleeves 33 and a bearing 35 of a selected type secured within the heavy walled sleeve 34. --; Claim 2, line 2, "in" should be --is--.

Signed and sealed this 9th day of May 1972.

(SEAL)
Attest:

EDWARD M. FLETCHER, JR.          ROBERT GOTTSCHALK
Attesting Officer          Commissioner of Patents